US011353000B2

(12) United States Patent
Zhang et al.

(10) Patent No.: US 11,353,000 B2
(45) Date of Patent: Jun. 7, 2022

(54) WAVE-DIRECTION-ADAPTIVE WAVE FOCUSING TYPE WAVE ENERGY CONVERTOR WITH MULTIPLE WATER CHANNELS

(71) Applicant: DALIAN UNIVERSITY OF TECHNOLOGY, Liaoning (CN)

(72) Inventors: Chongwei Zhang, Liaoning (CN); Zhenyu Ding, Liaoning (CN); Dezhi Ning, Liaoning (CN)

(73) Assignee: DALIAN UNIVERSITY OF TECHNOLOGY, Liaoning (CN)

( * ) Notice: Subject to any disclaimer, the term of this patent is extended or adjusted under 35 U.S.C. 154(b) by 106 days.

(21) Appl. No.: 16/980,737

(22) PCT Filed: Oct. 11, 2019

(86) PCT No.: PCT/CN2019/110587
§ 371 (c)(1),
(2) Date: Sep. 14, 2020

(87) PCT Pub. No.: WO2021/068191
PCT Pub. Date: Apr. 15, 2021

(65) Prior Publication Data
US 2021/0190031 A1    Jun. 24, 2021

(51) Int. Cl.
*F03B 13/16* (2006.01)
*H02K 11/00* (2016.01)
*H02K 11/04* (2016.01)

(52) U.S. Cl.
CPC .......... *F03B 13/16* (2013.01); *H02K 11/0094* (2013.01); *H02K 11/046* (2013.01)

(58) Field of Classification Search
CPC .... F03B 13/16; F03B 13/141; F03B 13/1865; F03B 13/1885; H02K 11/0094;
(Continued)

(56) References Cited

U.S. PATENT DOCUMENTS 5,701,740 A * 12/1997 Tveter .................... F03B 13/24
60/497
9,605,648 B1  3/2017 Lin
(Continued)

FOREIGN PATENT DOCUMENTS

CN    202073695 U    12/2011
CN    102828892 A    12/2012
(Continued)

*Primary Examiner* — Hoang M Nguyen
(74) *Attorney, Agent, or Firm* — Muncy, Geissler, Olds & Lowe, P.C.

(57) ABSTRACT

A wave-direction-adaptive wave focusing type wave energy convertor with multiple water channels, comprising an energy acquisition system, an energy conversion system and a support system. Wave focusing is carried out through double water channels, so that the movement amplitude of water particles behind a box is doubled. A device is connected with a fixed pile through universal bearings, so that an opening of the device is always faced to a wave flow direction, which adapts to different seasons and water conditions, has low environmental requirements, and can be used in a wide sea area. Several coils of pretension spring compression are arranged in a winding barrel, so that a nylon rope connected to a buoy is ensured to be always in a straightened state and not derail from pulley blocks to work abnormally due to looseness whether the buoy is at a wave crest or a wave trough.

1 Claim, 4 Drawing Sheets

(58) Field of Classification Search
CPC .............. H02K 11/046; H02K 7/1823; F05B 2240/913; F05B 2250/72; F05B 2260/40312; Y02E 10/30
USPC .............................. 60/502–504; 290/42, 53
See application file for complete search history.

(56) References Cited

U.S. PATENT DOCUMENTS

| | | | |
|---|---|---|---|
| 10,989,164 B2* | 4/2021 | Carter | ................ F03D 9/008 |
| 2013/0200627 A1* | 8/2013 | Deng | ................. F03B 13/20 |
| | | | 290/53 |
| 2015/0167628 A1* | 6/2015 | Potts | ................ F03B 13/145 |
| | | | 290/53 |
| 2017/0114771 A1* | 4/2017 | Lim | ................. H02K 7/1853 |
| 2019/0271293 A1* | 9/2019 | Carter | ................ H02K 7/1823 |

FOREIGN PATENT DOCUMENTS

| | | |
|---|---|---|
| CN | 103895823 A | 7/2014 |
| CN | 108518299 A | 9/2018 |
| CN | 109183709 A | 1/2019 |
| CN | 109236544 A | 1/2019 |
| WO | WO-2017073948 A1 | 5/2017 |

* cited by examiner

WAVE-DIRECTION-ADAPTIVE WAVE FOCUSING TYPE WAVE ENERGY CONVERTOR WITH MULTIPLE WATER CHANNELS

CROSS REFERENCE TO RELATED APPLICATIONS

This application is a U.S. National Stage of International Application No. PCT/CN2019/110587, the entire contents of which are hereby incorporated by reference.

TECHNICAL FIELD

The present invention belongs to the technical field of ocean energy utilization, and particularly relates to a wave energy convertor based on wave focusing and wave-direction-adaptive principles.

BACKGROUND

Oceans contain considerable energy. The full development and utilization of ocean energy can effectively fill the current energy gap in the world. Among various forms of ocean energy, wave energy has received wide attention due to the advantages such as being not limited by time or place and being widely distributed, and has shown a good application potential. However, although wave energy in many sea areas around the world is widely distributed, the density is uneven and the fluctuation with seasons is great, resulting in a low wave energy utilization rate of traditional wave energy devices. The present invention provides a wave energy convertor for a sea area with a low and medium wave energy density, which can utilize a structure with multiple water channels to focus wave energy, so as to increase the total amount of wave energy that can be captured in a local sea area and improve the wave energy utilization rate. At the same time, the convertor has the characteristic of being wave-direction-adaptive, which can adjust the heading angle to incident waves of the convertor according to the wave incoming direction to adapt to the wave direction changes in different seasons.

SUMMARY

The purpose of the present invention is to design an effective wave energy convertor for a sea area with a low and medium wave energy density and a changing wave direction. The principle of the convertor is that two symmetrical water channels are constructed to first divide one incident wave into two, the wave propagation direction is gradually changed by each water channel, and when the water channels intersect again, two waves of the same phase will collide head-on and result in a greater wave height, so that wave focusing is realized, the available wave energy density of the local sea area is increased, and the convertor utilizes the wave energy at the wave focusing position to generate electricity. At the same time, the convertor can be passively rotated according to the wave direction to make the entrance of the water channels always in a direction faced to waves, so as to adapt to the sea areas where the wave incoming direction is variable and the sea areas where the wave direction changes with seasons.

The technical solution of the present invention is:

A wave-direction-adaptive wave focusing type wave energy convertor with multiple water channels comprises an energy acquisition system, an energy conversion system and a support system;

The energy acquisition system comprises an external water baffle 1, a streamlined flow-guiding box 2, a buoy 3, a slide rail 4, fixed rods 5, a location hole for the pile 6, a high strength nylon rope 7 and water channels 29;

The external water baffle 1 is in a shape of semi-open dust-pan in a top view, and when working, a wave enters through an opening, and the external water baffle 1 passes through a free water surface vertically; the external water baffle 1 is sleeved on the periphery of the streamlined flow-guiding box 2, and the water channels 29 area is formed between the external water baffle 1 and the streamlined flow-guiding box 2; when entering through the opening, the wave is divided into a left and a right symmetrical water channels 29 by the streamlined flow-guiding box 2; the wave propagation direction is gradually changed by the two water channels 29, and when the two water channels reach an intersection of water channels 30, the directions of the two water channels become collinear, so that the waves in the two water channels can collide head-on; nine high strength steel pipes with a diameter as thin as possible and coated with a corrosion-resistant material on the surface are used as the fixed rods 5 for connection, and are respectively connected between the external water baffle 1 and the upper and lower ends of the streamlined flow-guiding box 2, so that the external water baffle 1 and the streamlined flow-guiding box 2 can rotate together as a whole; the height of the external water baffle 1 and the streamlined flow-guiding box 2 shows a parabolic increasing law from a head wave side to a back wave side; the distance between the external water baffle 1 and the streamlined flow-guiding box 2 shows a decreasing law in the first half, and keeps unchanged in the second half; a cylindrical concave groove, i.e. the location hole for the pile 6, is formed in the center of the bottom surface of the streamlined flow-guiding box 2, and the location hole for the pile 6 is matched with the upper end of a pile 15 through ball bearings 13; the vertical slide rail 4 is fixed at the intersection of water channels 30 near the outer wall of the streamlined flow-guiding box 2, the cylindrical buoy 3 is connected to the slide rail 4, and the high strength nylon rope 7 is connected to the center point of the bottom surface of the buoy 3; when working, the wave enters the energy acquisition system through the opening of the external water baffle 1 and is divided into two parts to enter the two water channels due to the hindering effect of the streamlined flow-guiding box 2; due to the gradual narrowing and direction change of the water channels, the water level is gradually raised, and the wave movement is changed from an initial parallel movement to a final collinear face-to-face movement; at the ends of the water channels, the two parts of wave collide and the amplitudes of movement are superimposed, driving the buoy 3 to suspend here; while the buoy 3 moves up and down with the wave, the kinetic energy of the buoy 3 is collected and transferred to the energy conversion system by the high strength nylon rope 7 connected to the bottom of the buoy 3;

The energy conversion system comprises the high strength nylon rope 7, fixed pulley blocks 8, a power generator room 9, a current rectifier 11, a storage battery 12, the ball bearings 13 and accesses for maintenance 14, wherein the power generator room 9 comprises cables 10, a flywheel rotor 17, cooling plates 18, an electric generator 19, an electric generator room 20, a waterproof shell 21, a gear set 23, a shaft 24 and a cable channel 25, and the gear set 23 comprises a nylon rope winding barrel 22, a pretension spring compression 16, a fixed gear 28, a ratchet 26 and a pawl 27; the high strength nylon rope 7 passes through the fixed pulley blocks 8 fixed on the external water baffle 1 and the streamlined flow-guiding box 2, and is finally connected to the nylon rope winding barrel 22 in the gear set 23; in the gear set 23, the nylon rope winding barrel 22 and the fixed gear 28 are coaxially fixed together, and a section of pretension spring compression 16 is placed around the central axis in the nylon rope winding barrel 22; the pawl 27 is fixed on the fixed gear 28 and pushed by a spring attached thereon to always rotate towards the central axis side, and the front section of the pawl is provided with a cantilever protruding forward, so that the fixed gear 28 can drive the pawl 27 to push the ratchet 26 to rotate together only when the fixed gear rotates in one direction, and when the fixed gear rotates in the other direction, the pawl 27 will only skim over a gear of the ratchet 26, but will not drive the gear to rotate together; the ratchet 26 and the fixed gear 28 are not fixed together, and a layer of ball bearings are arranged between the central axes of the two, so that the two are coaxial but can rotate relative to each other; in the power generator room 9, the ratchet 26 and the flywheel rotor 17 are simultaneously fixed on the same shaft 24, and the ball bearings 13 are simultaneously arranged on the upper and lower sides of the ratchet 26 and the flywheel rotor 17; a plurality of cooling plates 18 are evenly arranged on the outer side of a flywheel room so as to transfer the internal energy generated when a flywheel rotates; the lower side of the flywheel rotor 17 is connected with the electric generator room 20 to convert the kinetic energy generated by the flywheel rotor 17 into electric energy; finally, the waterproof shell 21 is sleeved on the outer side of the power generator room 9 to prevent seawater from seeping into the electric generator and the gear; the cables 10 led out from the electric generator room 20 pass through the cable channel 25, electric energy is transferred first to the current rectifier 11 and then to the storage battery 12 after rectification, and two cables 10 are externally connected to the storage battery to export electric energy; the accesses for maintenance 14 are reserved on the outer side of the current rectifier 11 and the storage battery 12 for the convenience of maintenance; when working, the high strength nylon rope 7 passes through the fixed pulley blocks and is wound on the nylon rope winding barrel 22; the high strength nylon rope 7 moves to drive the rotation of the nylon rope winding barrel 22, which in turn drives the rotation of the fixed gear 28 fixed with the nylon rope winding barrel 22; with the existence of the pawl 27, the fixed gear 28 can drive the ratchet 26 to rotate together only when the fixed gear 28 rotates in one direction; the ratchet 26 rotates to drive the flywheel rotor 17 coaxial with the ratchet 26 to rotate together, and the flywheel rotor 17 rotates normally and generates electricity in the power generator room 9 below; the electric energy generated is transferred by the power generator room 9 to the current rectifier 11, and a current is stabilized by the current rectifier 11 before being transferred to the storage battery 12.

The support system comprises the ball bearings 13 and the pile 15; the lower part of the pile 15 is buried in a seabed, and a plurality of ball bearings 13 are evenly arranged around the upper part of the pile, so that a device sleeved thereon can rotate freely around the pile 15 to ensure that the opening of the device is always faced to a wave incoming direction; when working, and mainly when the wave hits the external water baffle 1, the external water baffle 1 is rotated around the pile 15 through a plurality of rotating shafts 24.

The present invention has the following beneficial effects:

(1) Wave focusing is carried out through double water channels, so that the movement amplitude of water particles behind a box is doubled.

(2) A device is connected with a fixed pile through universal bearings, so that the opening of the device is always faced to a wave flow direction, which adapts to different seasons and water conditions, has low environmental requirements, and can be used in a wide sea area.

(3) Several coils of pretension spring compression are arranged in the winding barrel, so that the nylon rope connected to the buoy is ensured to be always in a straightened state and not derail from the pulley blocks to work abnormally due to looseness whether the buoy is at a wave crest or a wave trough.

(4) The pawl is fixed on the fixed gear connected with the ratchet, so that only the rotation in one direction of the bidirectional rotation of the winding barrel drives the rotation of the ratchet, thereby determining the one-way energy storage of the flywheel rotor in the power generator room and limiting the upper limit of the kinetic energy of the flywheel, so as to protect the safety of the flywheel.

(5) The flywheel rotor has a gyroscopic effect during rotation, so that the stability of the electric generator room fixed on the pile is ensured.

(6) The lower part of the electric generator is directly connected with the current rectifier and the storage battery, so that an unsteady current can be stabilized by the current rectifier first, and then input into the storage battery for storage or output directly and stably.

Figure 1:
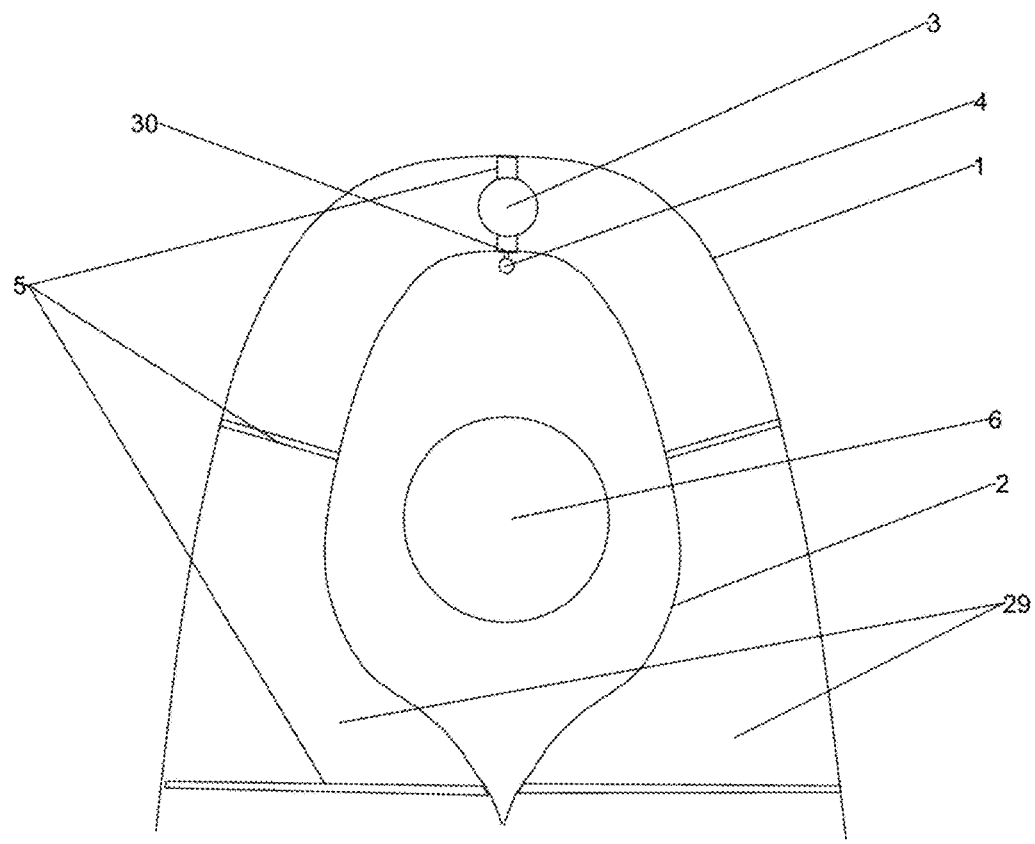
FIG. 1 is a top view of an energy acquisition system.
Figure 2:
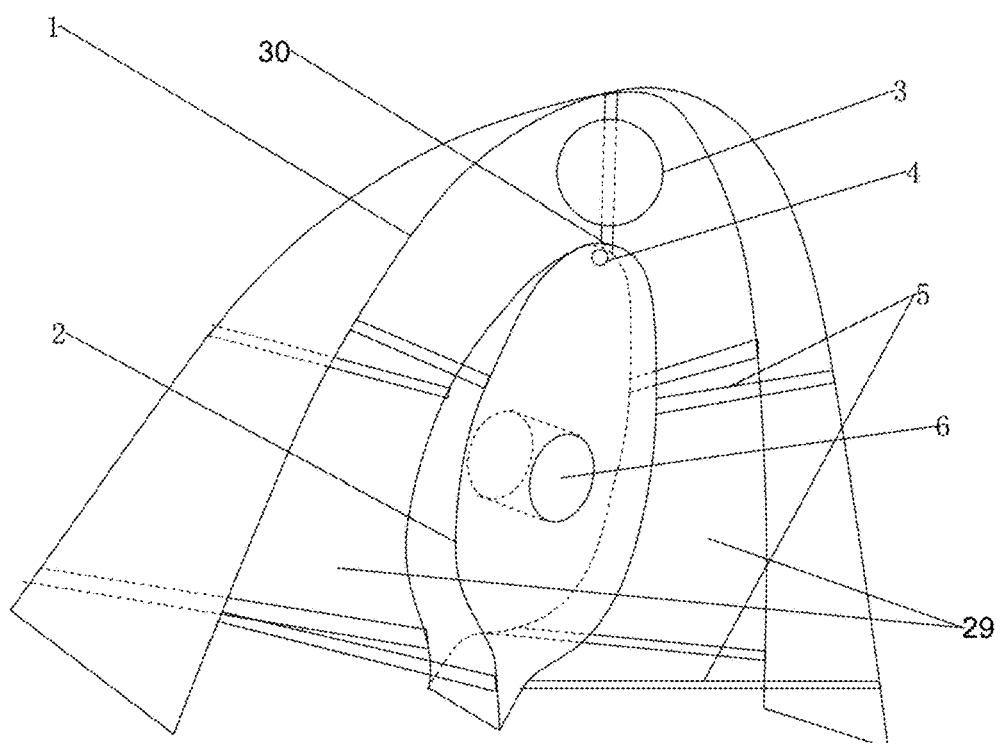
FIG. 2 is a perspective view of an energy acquisition system.
Figure 3:
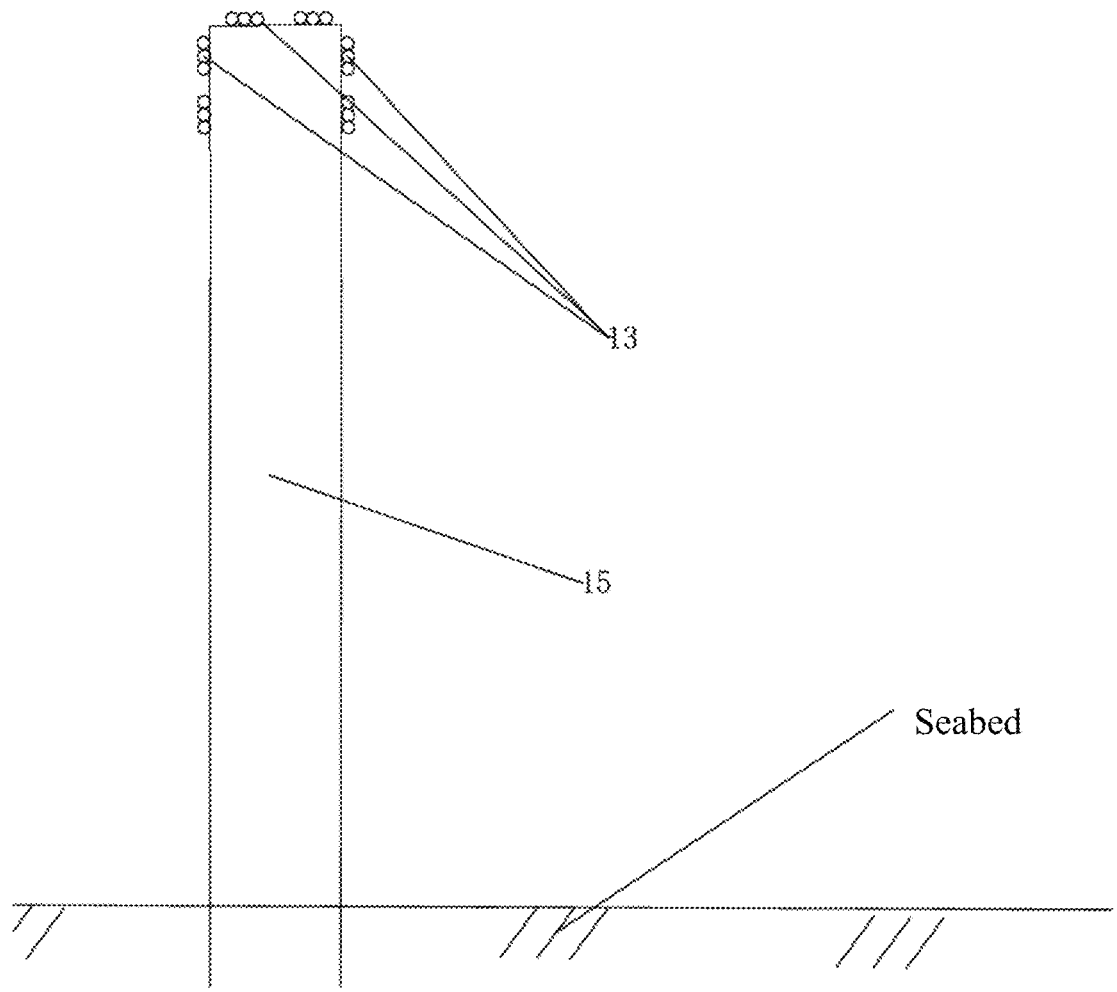
FIG. 3 is a front view of a support system.
Figure 4:
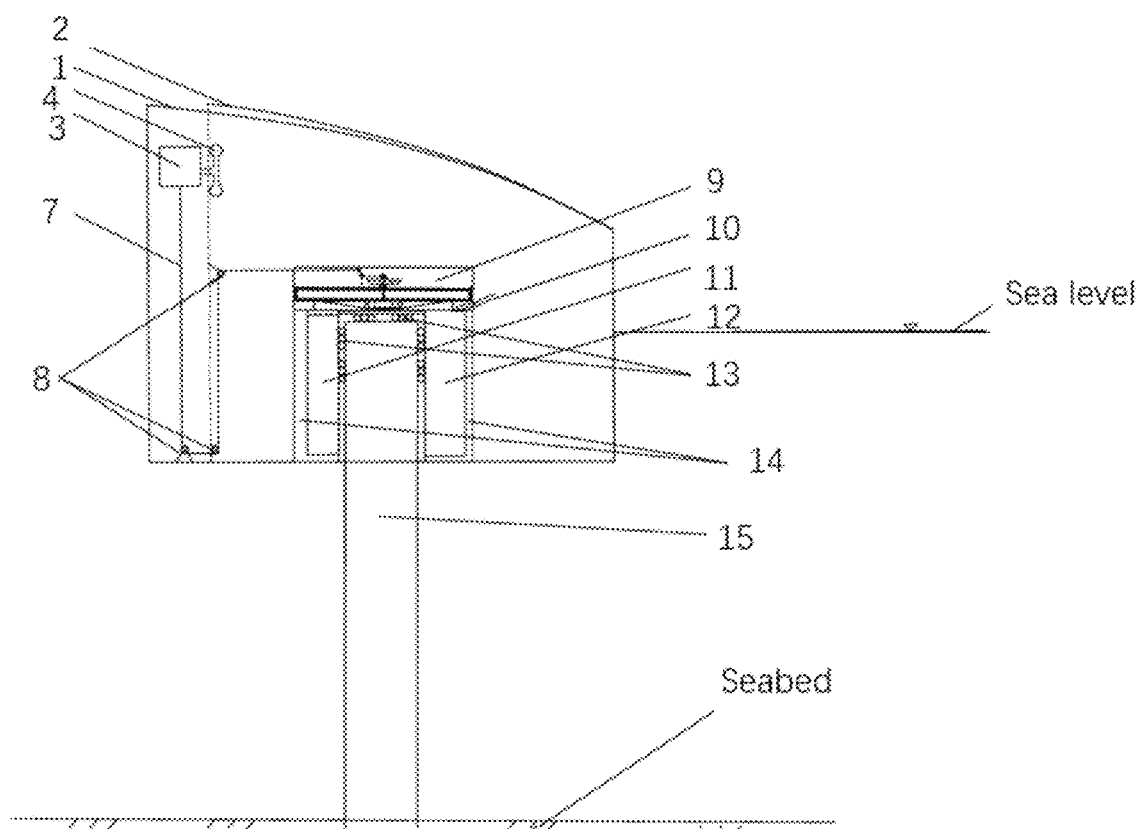
FIG. 4 is an overall side view of the present invention.
Figure 5:
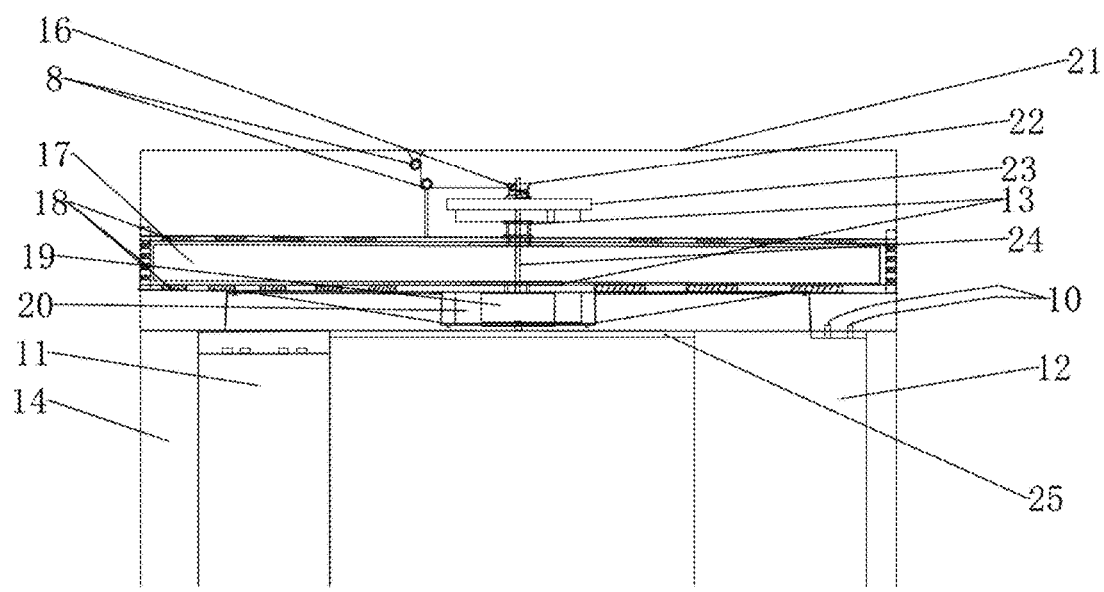
FIG. 5 is a detailed drawing of a power generator room.
Figure 6:
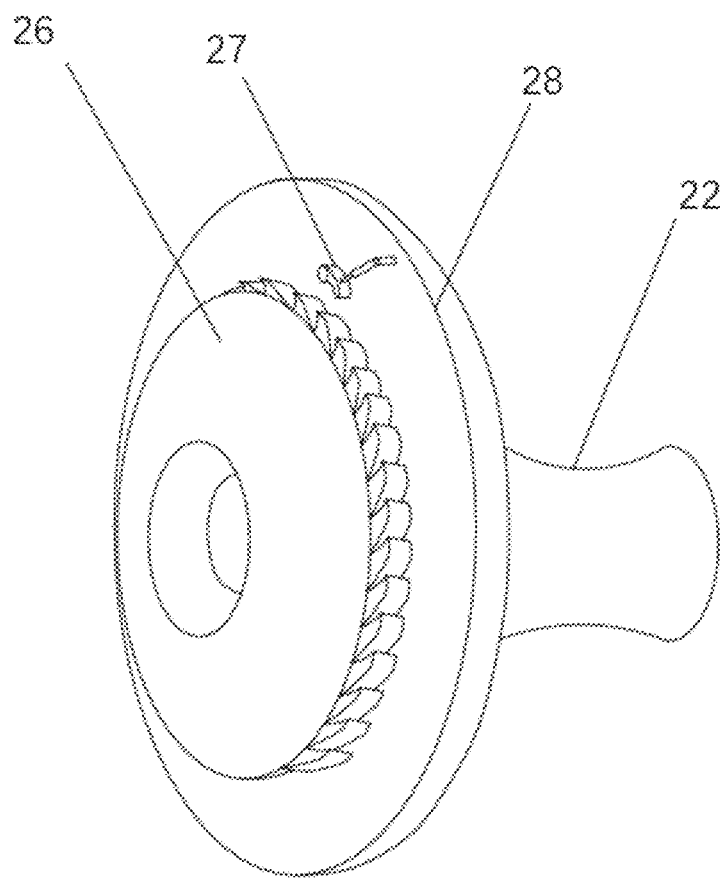
FIG. 6 is a detailed drawing of a gear set.

In the figures: 1 external water baffle; 2 streamlined flow-guiding box; 3 buoy; 4 slide rail; 5 fixed rod; 6 location hole for the pile; 7 high strength nylon rope; 8 fixed pulley block; 9 power generator room; 10 cable; 11 current rectifier; 12 storage battery; 13 ball bearing; 14 access for maintenance; 15 pile; 16 pretension spring compression; 17 flywheel rotor; 18 cooling plates; 19 electric generator; 20 electric generator room; 21 waterproof shell; 22 nylon rope winding barrel; 23 gear set; 24 shaft; 25 cable channel; 26 ratchet; 27 pawl; 28 fixed gear; 29 water channel; 30 intersection of water channels.

DETAILED DESCRIPTION

The present invention is further described below in detail in combination with the drawings and specific embodiments.

A circular hole is formed in the center of the streamlined flow-guiding box 2, and the pile 15 is fixed in this circular hole. Five steel members with a small diameter but a high strength are used to connect the external water baffle 1 and the flow-guiding box 2, and the position relationship between the two shall satisfy that the reserved width of the water channels remains basically unchanged behind the middle section of the box. The cylindrical buoy 3 is fixed right behind the box by the slidable slide rail 4, and a certain distance is reserved from the side wall. A plurality rows of bearings are arranged on the top of and around the pile 15 to ensure that the box can rotate freely along the pile 15. The pile 15 is buried in the seabed in advance.

The high strength nylon rope 7 is connected right below the buoy 3, passes through a plurality of fixed pulleys, penetrates through the waterproof shell 21, and is wound on the winding barrel. Several coils of pretension spring compression are placed around the central axis of the winding barrel. The winding barrel is fixed on the fixed gear 28, the fixed gear 28 and the ratchet 26 are placed coaxially but not fixed together, and a pawl 27 able to spring is arranged on the fixed gear 28 near gear teeth of the ratchet 26. A bearing is fixed along the shaft of the ratchet 26 and extended down to the shaft of the flywheel rotor 17, so that the ratchet 26 rotates to drive the flywheel rotor 17 to rotate together. In the flywheel room, the bearings are used in both the upper and the lower parts to isolate the rotor from the upper and lower room walls, and a plurality rows of cooling plates 18 are arranged around the outer side of the flywheel room. The electric generator room 20 is arranged below, the electricity in the electric generator 19 is conducted to the rectifier through a cable channel, then the electricity in the rectifier is transmitted to the storage battery 12, and several cables 10 are externally connected to the storage battery 12. The accesses for maintenance 14 are reserved on the side walls of rooms of the current rectifier 11 and the storage battery.

The specific parameters of an embodiment are as follows:

The present invention is mainly suitable for offshore waters, and only refers to the perennial 6 m water depth of the offshore waters of the South China Sea. The buoy 3 is designed as a cylindrical object with a diameter of 0.5 m and a height of 0.4 m. The width of the opening end of the external water baffle 1 is 6 m, the length of the central longitudinal axis is 5.9 m, and the height of the head wave side is 3 m. The width of the water channels between the flow-guiding box 2 behind the middle section and the external water baffle is 1 m, and the height of the flow-guiding box is the same as that of the external water baffle. The pile 15 has a height of 7.2 m and a diameter of 9.2 m. The diameter of the flywheel rotor is 2.2 m.

The invention claimed is:

1. A wave-direction-adaptive wave focusing type wave energy convertor with multiple water channels, comprising an energy acquisition system, an energy conversion system and a support system;

the energy acquisition system comprises an external water baffle (1), a streamlined flow-guiding box (2), a buoy (3), a slide rail (4), fixed rods (5), a location hole for a pile (6), a high strength nylon rope (7) and water channels (29); said water channels include left and right symmetrical channels;

the external water baffle (1) is in a shape of semi-open dust-pan in a top view, and when working, a wave enters through an opening, and the external water baffle (1) passes through a free water surface vertically; the external water baffle (1) is sleeved on the periphery of the streamlined flow-guiding box (2), and the water channels (29) area is formed between the external water baffle (1) and the streamlined flow-guiding box (2); when entering through the opening, the wave is divided into the left and a right symmetrical water channels (29) by the streamlined flow-guiding box (2); the wave propagation direction is gradually changed by the left and a right water channels (29), and when the left and a right water channels reach an intersection of water channels (30), the directions of the left and a right water channels become collinear, so that the waves in the left and a right water channels can collide head-on; nine high strength steel pipes coated with a corrosion-resistant material on the surface are used as the fixed rods (5) for connection, and are respectively connected between the external water baffle (1) and the upper and lower ends of the streamlined flow-guiding box (2), so that the external water baffle (1) and the streamlined flow-guiding box (2) can rotate together as a whole; the height of the external water baffle (1) and the streamlined flow-guiding box (2) shows a parabolic increasing law from a head wave side to a back wave side; the distance between the external water baffle (1) and the streamlined flow-guiding box (2) shows a decreasing law in the first half, and keeps unchanged in the second half; a cylindrical concave groove is the location hole for the pile (6) and is formed in the center of the bottom surface of the streamlined flow-guiding box (2), and the location hole for the pile (6) is matched with the upper end of the pile (15) through ball bearings (13); the vertical slide rail (4) is fixed at the intersection of water channels (30) near the outer wall of the streamlined flow-guiding box (2), the cylindrical buoy (3) is connected to the slide rail (4), and the high strength nylon rope (7) is connected to the center point of the bottom surface of the buoy (3); when working, the wave enters the energy acquisition system through the opening of the external water baffle (1) and is divided into two parts to enter the left and right water channels due to the hindering effect of the streamlined flow-guiding box (2); due to the gradual narrowing and direction change of the water channels, the water level is gradually raised, and the wave movement is changed from an initial parallel movement to a final collinear face-to-face movement; at the ends of the water channels, the two parts of wave collide and the amplitudes of movement are superimposed, driving the buoy (3); while the buoy (3) moves up and down with the wave, the kinetic energy of the buoy (3) is collected and transferred to the energy conversion system by the high strength nylon rope (7) connected to the bottom of the buoy (3);

the energy conversion system comprises the high strength nylon rope (7), fixed pulley blocks (8), a power generator room (9), a current rectifier (11), a storage battery (12), the ball bearings (13) and accesses for maintenance (14), wherein the power generator room (9) comprises cables (10), a flywheel rotor (17), cooling plates (18), an electric generator (19), an electric generator room (20), a waterproof shell (21), a gear set (23), a shaft (24) and a cable channel (25), and the gear set (23) comprises a nylon rope winding barrel (22), a pretension spring compression (16), a fixed gear (28), a ratchet (26) and a pawl (27); the high strength nylon rope (7) passes through the fixed pulley blocks (8) fixed on the external water baffle (1) and the streamlined flow-guiding box (2), and is finally connected to the nylon rope winding barrel (22) in the gear set (23); in the gear set (23), the nylon rope winding barrel (22) and the fixed gear (28) are coaxially fixed together, and a section of pretension spring compression (16) is placed around the central axis in the nylon rope winding barrel (22); the pawl (27) is fixed on the fixed gear (28) and pushed by a spring attached thereon to always rotate towards the central axis side, and the front section of the pawl is provided with a cantilever protruding forward, so that the fixed gear (28) can drive the pawl (27) to push the ratchet (26) to rotate together only when the fixed gear rotates in one direction, and when the fixed gear rotates in the other direction, the pawl (27) will only skim over a gear of the ratchet (26), but will not drive the gear to rotate together; the ratchet (26) and the fixed gear (28) are not fixed together, and a layer of ball bearings are arranged between the central axes of the two, so that the two are coaxial but can rotate relative to each other; in the power generator room (9), the ratchet (26) and the flywheel rotor (17) are simultaneously fixed on the same shaft (24), and the ball bearings (13) are simultaneously arranged on the upper and lower sides of the ratchet (26) and the flywheel rotor (17); a plurality of cooling plates (18) are evenly arranged on the outer side of a flywheel room so as to transfer the internal energy generated when a flywheel rotates; the lower side of the flywheel rotor (17) is connected with the electric generator room (20) to convert the kinetic energy generated by the flywheel rotor (17) into electric energy; finally, the waterproof shell (21) is sleeved on the outer side of the power generator room (9) to prevent seawater from seeping into the electric generator and the gear; the cables (10) led out from the electric generator room (20) pass through the cable channel (25), electric energy is transferred first to the current rectifier (11) and then to the storage battery (12) after rectification, and two cables (10) are externally connected to the storage battery to export electric energy; the accesses for maintenance (14) are reserved on the outer side of the current rectifier (11) and the storage battery (12) for the convenience of maintenance; when working, the high strength nylon rope (7) passes through the fixed pulley blocks and is wound on the nylon rope winding barrel (22); the high strength nylon rope (7) moves to drive the rotation of the nylon rope winding barrel (22), which in turn drives the rotation of the fixed gear (28) fixed with the nylon rope winding barrel (22); with the existence of the pawl (27), the fixed gear (28) can drive the ratchet (26) to rotate together only when the fixed gear (28) rotates in one direction; the ratchet (26) rotates to drive the flywheel rotor (17) coaxial with the ratchet (26) to rotate together, and the flywheel rotor (17) rotates normally and generates electricity in the power generator room (9) below; the electric energy generated is transferred by the power generator room (9) to the current rectifier (11), and a current is stabilized by the current rectifier (11) before being transferred to the storage battery (12); and the support system comprises the ball bearings (13) and the pile (15); the lower part of the pile (15) is buried in a seabed, and a plurality of ball bearings (13) are evenly arranged around the upper part of the pile, so that a device sleeved thereon can rotate freely around the pile (15) to ensure that the opening of the device is always faced to a wave incoming direction; when working, and mainly when the wave hits the external water baffle (1), the external water baffle (1) is rotated around the pile (15) through a plurality of rotating shafts (24).

* * * * *